Sept. 4, 1962

D. E. OLSEN ET AL 3,052,827

MAGNETIC DISCRIMINATOR

Filed Feb. 7, 1955

INVENTORS
L. E. RICHTMYER
C. A. WILSON
G. J. MYERS
D. E. OLSEN

BY

ATTORNEYS

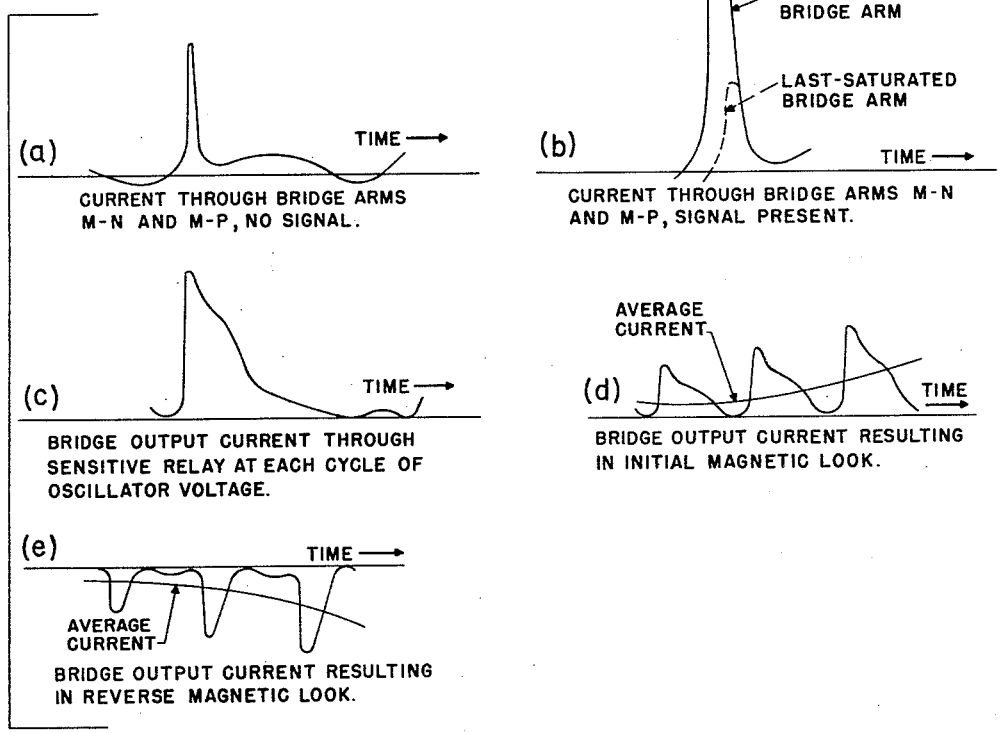
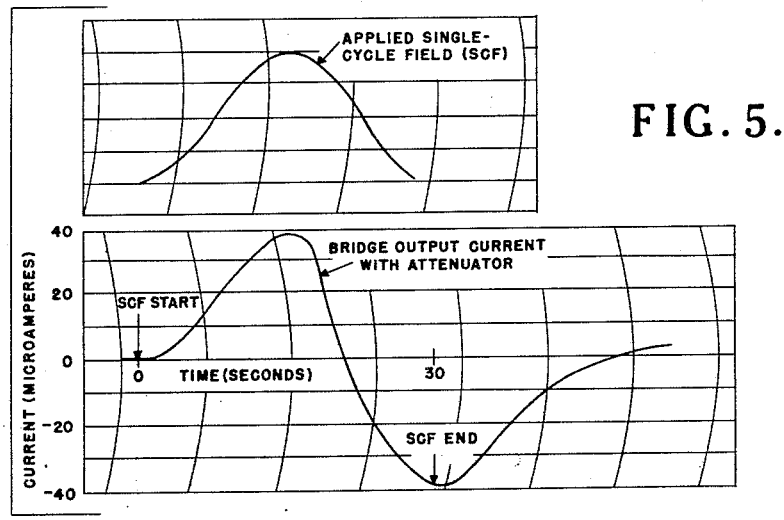

United States Patent Office 3,052,827
Patented Sept. 4, 1962

1

3,052,827
MAGNETIC DISCRIMINATOR
David E. Olsen, Rte. 2, Box 57, Laurel, Md.; Lawson E. Richtmyer, 9102 Providence Ave., and Charles A. Wilson, 1612 Cody Drive, both of Silver Spring, Md.; and George J. Myers, 1209 30th St. SE., Washington 19, D.C.
Filed Feb. 7, 1955, Ser. No. 486,742
11 Claims. (Cl. 317—150)
(Granted under Title 35, U.S. Code (1952), sec. 266)

The invention described herein may be manufactured and used by or for the Government of the United States of America for governmental purposes without the payment of any royalties thereon or therefor.

This invention relates to magnetic amplifiers utilized in control systems and devices for a submarine mine adapted to be fired automatically upon the approach of a vessel and in which the possibility of premature detonation of the mine is substantially reduced. More specifically, the invention provides a unique magnetic amplifier arrangement whereby the mine is in a quiescent condition until the vessel moves nearby with respect to the search coil of the mine so that two magnetic signals of opposite polarity, induced in the search coil by the magnetic field of the vessel, have been received by the magnetic amplifier in predetermined time spaced relation.

Generally, mines of this type are actuated by three different influence fields, namely magnetic, acoustic, and pressure, either singly or in combination. The instant disclosure deals only with that constructional portion of the mine that responds to the magnetic field of a passing vessel and which is referred to, hereinafter, as the magnetic firing mechanism; and, more particularly, the invention is directed to a magnetic amplifier capable of discriminating between magnetic signals of opposite polarity to arm the mine.

In the system of the instant invention as a vessel approaches the magnetically operated mine, its magnetic field induces into the search coil of the magnetic firing mechanism a voltage of a given polarity, either positive or negative, depending upon the orientation of the search coil windings with respect to the approaching magnetic field. The magnetic field of the vessel will continue to induce into the search coil a voltage of the same polarity until the vessel approaches near the mine. As the vessel passes by the mine and starts to move away, a voltage of opposite polarity from the initial given polarity is induced in the search coil since the nearby or receding magnetic field is now oppositely disposed with respect to the orientation of the search coil windings.

The magnetic firing mechanism has a sensitive relay which closes the actuation circuit of the mine when the magnetic influence field is of proper magnitude, rate of change and duration. Two magnetic looks of opposite polarity are required for the sensitive relay to complete the actuation circuit. The term "look," as used in this specification, means that the switch of the sensitive relay has closed because the magnetic influence field satisfied the requirements of the magnetic firing mechanism.

A control box, containing timing and switching devices which prescribe over-all control of the mine during its live period, operates conjunctively with the magnetic firing mechanism to register the polarity of magnetic looks received by the search coil. The live period of the mine begins only when a magnetic look of either polarity is registered. The look starts a motor in the control box, initiating the live period of the mine.

The live period of the mine can be selectively predetermined by presetting time adjustment controls in the control box. For example, live periods of 60 or 120 seconds may be chosen by adjustment of the control box. In order for a ship to be registered, the reverse magnetic look must occur before expiration of the live period.

The control box also has provisions for setting an interval of time after initiation of the live period during which no reverse magnetic look can occur. Such interval of time shall hereinafter be referred to as "interlook dead period." The actuation circuit of the mine cannot be operated prior to the expiration of the interlook dead period. Therefore, in order for the actuation circuit of the mine to close, it is necessary to receive a first magnetic look of a given polarity to initiate the live period and the interlook dead period and to then receive a reverse magnetic look after the interlook dead period has elapsed but prior to the expiration of the live period. Of course, it is to be understood that, if acoustic and pressure firing mechanisms are utilized conjunctively with the magnetic firing mechanism, an acoustic, pressure, or reverse magnetic look may occur in any order during the live period initiated by the first magnetic look but must occur before expiration of the live period setting if a ship is to be registered.

Occurrence of the required looks does not complete a direct circuit through the primer but instead operates an actuation counter which is preset to complete the primer circuit through a primer control mechanism which may be designed to ignite the primer in any suitable manner or time relationship as desired.

The present invention contemplates the provision, in a magnetic firing mechanism for a mine, of a balanced self-biased magnetic amplifier bridge which is energized by a transistor oscillator. A variable resistance connected in one arm of the bridge across the rectifier is utilized to initially balance the bridge. Thereafter, bridge balance is maintained by a pair of condensers connected in the output of the amplifier, the condensers acting to compensate for large unbalances caused by strong signals introduced in the control winding of the bridge. The condensers also compensate for drift in the bridge caused by aging of the components and decreasing A.C. voltage across the bridge. A sensitive polarized relay is connected in series with the condensers across the output of the bridge to register the polarized signals received and close a firing control circuit.

Heretofore, amplifiers similarly used in mines for detecting the presence of vessels employed high voltage tubes which were extremely sensitive to temperature changes and shock, and required a large power supply source.

The advantages over the prior art presented by the arrangement of the instant invention are increased sensitivity, low power consumption, greater stability with respect to temperature changes and current depletion of the power supply battery, and inherent insensitivity to shock and vibration.

An object of the present invention is the provision of a polarity discriminating magnetic amplifier in a mine detonating system.

Another object is to provide a balanced magnetic amplifier in a mine detonating system adaptable to be unbalanced in one direction corresponding to the polarity of the magnetic field of a vessel as it approaches the mine and to be unbalanced in another direction corresponding to the oppositely polarized magnetic field developed by the vessel as it moves away from the mine.

Still another object is to provide a magnetic amplifier in a mine detonating system for maintaining the mine in a quiescent condition until the amplifier receives in predetermined time spaced relation two magnetic signals of opposite polarity developed by the magnetic field of a passing vessel.

A further object of the invention is the provision, in a magnetic bridge amplifier, of a selectively adjustable impedance element in one leg of the bridge to compensate for manufacturing differences in the impedance values of similarly functioning components in the legs of the bridge to initially balance the bridge and reactance means for automatically compensating for bridge unbalance caused by degeneration of the components due to aging and shock.

Another further object is to provide, in a magnetic bridge amplifier, a variable resistor in one leg of the bridge to initially balance the bridge under no-signal condition and large capacitive reactance means in the output of the bridge to compensate for bridge unbalance caused by degeneration of the components therein due to continuous use, age, and shock.

A still further object of the invention is to provide, in a polarity discriminating magnetic amplifier, current sensitive means in the output circuit of the amplifier for detecting the polarity of a direct current signal applied to the input of the amplifier, a pair of spaced stationary magnetized contact members, a swinging contact member having a neutral position intermediate the spaced contacts operatively associated with the sensitive means to swing in a direction corresponding to the detected polarity of the applied input signal to engage one of the stationary contact members, reset means adaptable upon actuation thereof to restore the swinging member to its neutral position, and control means responsive to engagement of the swinging member with one of said stationary members to render the input circuit insensitive for a predetermined period of time, and to enable the input circuit and actuate the reset means after the predetermined period of time has elapsed.

Another further object is to provide a magnetic amplifier having interruptable positive feedback, input and output circuits, control means responsive to the output circuit for interrupting the aforesaid circuits at predetermined intervals of time, and resistance means connected across the input circuit for limiting switching transients induced in the amplifier during the interrupting operations.

A primary object of the invention is to provide a magnetic bridge amplifier for use in a mine registering system capable of detecting the polarity of the magnetic field signal of a vessel as it approaches the mine, resetting the polarity detecting element of the bridge after a predetermined interval of time to register subsequent magnetic field signals, and registering the reverse polarity of a subsequent magnetic field signal as the vessel recedes from the mine to cause the mine to detonate, the magnetic bridge amplifier being characterized by a variable resistance element in one of the legs to compensate for the manufacturing impedance differences in the components of the bridge and by large capacitive reactance elements in the output of the bridge to automatically compensate for degeneration of the bridge components due to age and shock.

Other objects and many of the attendant advantages of this invention will be readily appreciated as the same becomes better understood by reference to the following detailed description when considered in connection with the accompanying drawings in which like reference numerals designae like parts throughout the figures thereof and wherein:

FIGURE 2 illustrates schematically in circuit diagram a portion of the arrangement shown in FIGURE 1;

FIGURE 4(a to e) illustrates the output current wave forms of the bridge under different conditions of operation; and FIGURE 5 illustrates the bridge output current resulting from an applied signal.

Figure 1:
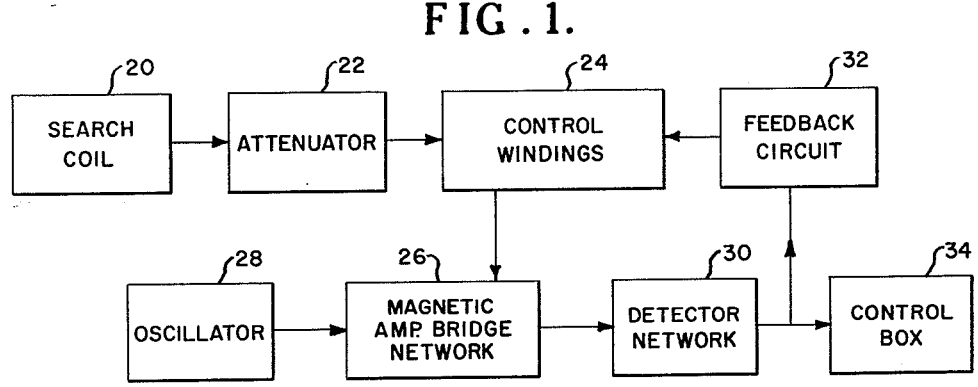
FIGURE 1 shows, in block diagram, the circuit arrangement of the magnetic firing mechanism of the invention.

Referring now to the drawings, wherein like reference characters designate like or corresponding parts throughout the several views, there is shown in FIGURE 1 the magnetic firing mechanism circuit in block diagram. A search coil 20, having currents induced therein by magnetic field changes caused by a passing vessel, applies the output current, corresponding to the magnetic signature of a passing vessel, to an attenuator network 22, the values of the components thereof being selected in accordance with the operational requirements.

The attenuated search coil signal passes through the control winding 24 of the magnetic amplifier 26 which is of the balanced bridge type, the bridge balance being automatically maintained by condensers in the output thereof as will become more apparent from the description of FIGURE 2. Oscillator 28 applies the energizing potential to the amplifier 26. The bridge is unbalanced in proportion to the signal through the control winding.

Figure 3:
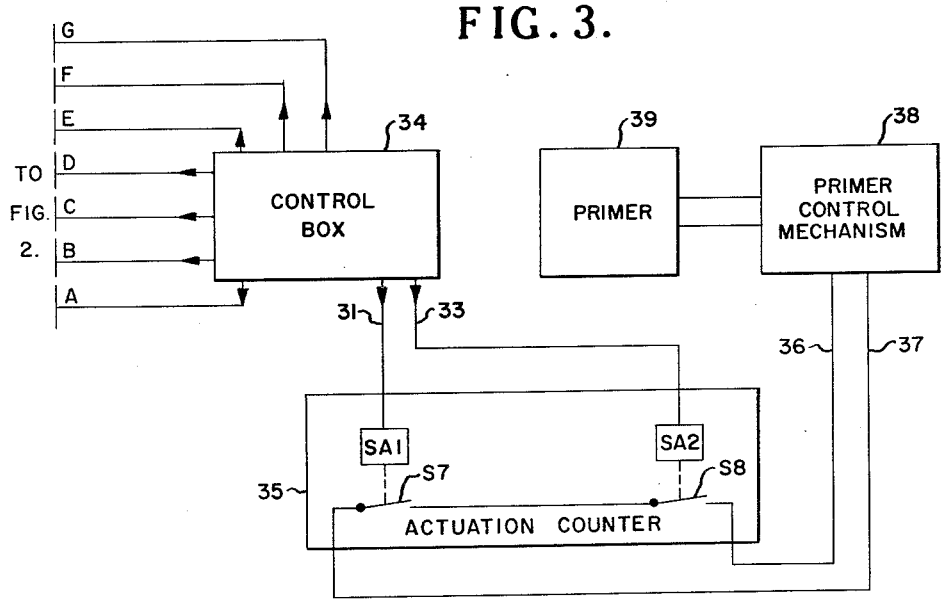
FIGURE 3 is a continuation of FIGURE 2 and shows the remainder of the arrangement of FIGURE 1 partly in block diagram and partly schematically.

The bridge unbalance is detected by means of a sensitive relay in detector network 30. The sensitive relay includes magnetized stationary double contacts, M1 and M2, with a normally neutral position movable pointer contact 70, shown in FIGURE 2. If the unbalance current is sufficient, the pointer of the sensitive relay closes to one of the stationary contacts thereby operating control box 34 to complete a portion of the actuation counter circuit 35 (FIGURE 3). A second closure of the sensitive relay, this time in the opposite direction, again operates the control box to complete the actuation circuit through the primer firing mechanism.

A feedback circuit 32 provides positive feedback to increase amplification primarily for slowly varying signals. This circuit tends to equalize mechanism response to slow and fast signals.

Referring now to FIGURE 2, search coil 20 is connected to contacts 8 and 14 of plug-in-jack 18 through a relay operated switch S1. Contacts 14 and 8 connect search coil 20 to control windings L4 and L7 from contact 14 through lead 63, jack 19, attenuator 22, lead 56, choke coil L9, line 57, windings L4 and L7, and lines 59 and 61 to contact 8.

The attenuator 22 is made up of three resistors, the values of which may be selected according to the operational requirements. By having available several attenuators of different valued resistors, the over-all sensitivity of the firing mechanism can be varied by plugging in any one of the several attenuators as desired.

The transistor oscillator, indicated generally by reference numeral 28, operates on a class C basis from a 6 volt D.C. supply applied to contacts 1 and 2 of plug 17, the oscillator output preferably having a frequency of 115 c.p.s. although any low frequency desired may be used. The circuit consists of a transistor circuit that is transformer-coupled to a tuned tank output circuit. Positive feedback from the secondary of the output transformer is used. The transistor acts much as a switch that is turned on and off on the rising and decaying portions, respectively, of the positive half-cycle of the feedback voltage. Oscillator output is applied across the magnetic bridge amplifier at points M—O.

The primary component of the oscillator 28 is the n-type, point contact transistor 41. Negative potential is applied through lead 42 and primary winding L1 of transformer T1 to the collector electrode, positive potential being applied through lead 43 and rectifier 40 to the base and through lead 43, windings L2, L3, lead 23, and resistors R2, R1 to the emitter electrode. Before oscillation will begin, the emitter must be biased positively with respect to base. This is accomplished by applying positive potential to contact 2 of plug 17 to complete a circuit through lead 43, rectifier 40, which is preferably of the copper oxide type, resistor R3 and lead 42 to pin 1 of plug 17. The voltage drop across rectifier 40 provides negative bias for the base with respect to the emitter, the positive bias on the emitter being sufficient to insure self-starting of the oscillator.

The initial collector current pulse induces a voltage in the emitter feedback winding L3 and the output winding L2. The induced voltage across the feedback winding increases the emitter current, and this in turn increases the collector current. Energy in the output tank circuit alternates between the inductance L2 and capacitor C3, causing oscillation of the output voltage. R2 and C1, paralleled in the emitter circuit, serve to achieve class C operation by maintaining a net negative bias on the emitter after oscillation begins, the negative bias resulting from the rectifying action of the emitter and its resultant current flowing in resistor R2 and from the charging of condenser C1 to the voltage across resistor R2. The collector tank circuit consists of inductance L1 and condenser C2. The oscillator frequency is determined by the parameters of L2 and C3. The output of the oscillator is taken from output tank circuit L2 and C3 is applied to points M and O of the magnetic amplifier through leads 27 and 29.

The main components of the magnetic amplifier bridge are two matched saturable reactors, T2 and T3, each reactor consisting of a load winding and a control winding wound on a high-permeability core. Reactor T2 has control winding L4 and load winding L5 in the bridge arm M—N, and reactor T3 has control winding L7 and load winding L6 in bridge arm M—P.

Due to slight manufacturing differences in the components of the bridge arms M—N and M—P, the impedance across each arm may be slightly different. In order to compensate for manufacturing tolerances, variable resistor VR is provided to balance the bias currents and so equalize the voltage drop across the two arms, thus maintaining a balanced bridge under no-signal conditions. Resistor R11 is connected across control windings L4 and L7 to limit switching transients which might otherwise be caused by large impedance changes that occur when the search coil circuit is opened or closed.

Connected in series with load windings L5 and L6 are rectifiers 50 and 60, respectively, shunted by resistors R7 and R8 in series with VR, respectively. Resistor R8 has a resistance value less than, but approaching, the value of resistor R7; for example, resistor R7 may have a value of 250 kilohms and resistor R8 may be a 200 kilohms resistor. Resistor VR may have a range of from 0 to 100 kilohms. Therefore, it is seen that the series resistance of VR with R8 may be less, equal to, or greater than the resistance of R7, thereby providing manually adjustable to compensate for manufacturing differences in the impedances of the components in arms M—P and N—P. It is to be understood that the aforesaid values of resistors VR, R7 and R8 are only exemplary for purposes of explanation. Each rectifier is shunted so that the amount of negative load current flowing is controlled by the shunt rather than by the back resistance of the rectifier, thus minimizing the effect of the changes in rectifier back-resistance due to aging or temperature changes. These shunting resistors determine the extent to which the negative induction of each core goes negative on the negative swing of the oscillator voltage.

The remainder of the bridge comprises two legs N—O and O—P, leg N—O being formed by resistor R4 and condenser C-4 connected in parallel and leg O—P composed of resistor R5 and condenser C5 connected in parallel.

Two relays are used in the firing mechanism; a sensitive relay, indicated generally as RL4 which functions as the signal detector, and a slow release relay RL1. When the coil 30 of sensitive relay RL4 is energized by a varying direct current from magnetic amplifier 26, a moving contact pointer 70 closes to either of two stationary contacts, M1 and M2. Stationary contacts M1 and M2 are magnetized and so hold the pointer 70 until it is reset.

To reset the pointer, a reset solenoid RL3 must be energized to actuate centering blades 71 which operate to disengage pointer 70 from either of contacts M1 or M2, pointer 70 returning to the neutral position upon being released from either of contacts M1 or M2. Solenoid RL3 is energized as prescribed by control box 34 (FIGURE 3) through lead E, contact 7 of plug 17, lead 69, the winding of relay RL3, conductor 74, switch S6 when closed by relay RL1, conductors 73 and 64, and contact 5 of plug 17 to conductor C.

Relay RL1 operates three single-pole single-throw switches S4, S5 and S6, switches S4 and S5 being normally closed and switch S6 being normally opened. When the coil of relay RL1 is energized from control box 34 (FIGURE 3) through leads A and E, contacts 3 and 7 of plug 17, and leads 67, 68 and 69 at intervals prescribed by control box 34, the normally closed switches S4 and S5 open an instant before normally open switch S6 closes.

Normally closed switch S4 connects the parallel connected condensers C6 and C7 in series with coil 30 of relay RL4 across the output points N and P of bridge 26 through variable resistor R6, condensers C6—C7, conductor 44, contact 10 of plug 18, jumper 48, contact 11 of plug 18, lead 45, coil 30, lead 46, switch S4, and lead 47. A resistor R13 connected across switch S4 serves to maintain the bridge 26 balanced when switch S4 is opened by suppressing undesired parasitic oscillations which may arise during the opening and closing of switch S4.

Normally closed switch S5 serves to complete the positive feedback circuit from the output of bridge 26 across divider network R9—R10, lead 51, contacts 12 and 13 of plug 18 through switch S3, line 52, switch S5, lead 53 and coil L8 to the input of the bridge at the junction between resistor R11 and choke coil L9.

Normally open switch S6 is operative when closed to supply energizing potential to reset coil RL3 from control box 34 through lead E, contact 7 of plug 17, conductor 69, coil RL3, line 74, switch S6, lead 73, lead 64, contact 5 and conductor C back to control box 34.

As the magnetic bridge amplifier 26 is energized across points M—O with no signal current flowing in the control winding circuit, each cycle of the oscillator drives the cores of the saturable reactors, T2 and T3, through a complete cycle of magnetization, the two cores simultaneously going through the cycle and into saturation, as shown in FIGURE 4(a). Uncanceled voltages induced in the control windings because of the transformer effect are limited by means of inductance L9, which is selected to present a large impedance to the oscillator frequency and its harmonics.

When a current is induced in search coil 20, a small signal current flows through control windings L4 and L7, and, since the control windings L4 and L7 are connected in phase opposition with respect to each other, the magnetic field at one of the cores (either of reactor T2 or T3) aids the magnetic field caused by the load winding current whereas the magnetic field of the other core opposes the magnetic field of the load winding current. At each cycle of applied oscillator voltage, the aiding core, because it requires a smaller increase in current through the load winding to drive the core to saturation, saturates first and to a greater extent.

When the first saturable core is saturated, the coils wound on that core offer a relatively small impedance causing a greater current flow through its respective arm of the bridge until the other core is saturated, as illustrated in FIGURE 4(b), the two cores coming out of saturation almost simultaneously at which time the bridge arm impedances are again equalized. In the interval between saturation of the two cores, there is an unbalanced voltage across points N and P of bridge 26 which persists for an instant during each cycle of oscillator voltage applied to the bridge. The magnitude of the current flow in the control winding determines the degree of saturation of the two coils, and this, in turn, determines the unbalance current flowing through the detector circuit between points N—P, as shown in FIGURE 4(c).

As the current in the control winding increases, the amplitude of the current pulses through the sensitive relay RL4 increases as shown in FIGURE 4(d). FIGURE 4(e) shows the increasing amplitude of the current pulses after the polarity of the magnetic field at the search coil reverses. There is some change in wave shape in FIGURE 4(e) because of bridge and core conditions resulting from the initial unbalance.

The effect of a signal on bridge output current is shown in FIGURE 5. A single-cycle magnetic field at the search coil results in the average bridge output current shown.

When the core in arm M—P saturates first, the unbalance current takes two paths, part of the current flowing through sensitive relay RL4 and then arm N—O and the remainder of the current flowing directly through arm P—O. The impedance of the detector network is relatively small, so that almost one-half the unbalance current flows through sensitive relay RL4. With unbalance in the assumed direction, condenser C5 charges to a higher potential than condenser C4. After both cores are no longer saturated, condenser C5 discharges to prolong the potential difference caused between points N—P by bridge unbalance thereby smoothing the current through the sensitive relay coil 30.

If the core in arm M—N saturates first, almost one-half the unbalance current flows through sensitive relay coil 30 and arm P—O, and the remainder of the current flows through arm N—O. Under this condition, condenser C4 charges to a higher potential than condenser C5 and discharges, after both cores are no longer saturated, to smooth the current through the sensitive relay coil 30.

The detector network consists of the circuit connecting points N and P of the bridge and include resistor R6, paralleled capacitors C6 and C7, the coil 30 of sensitive relay RL4 which serves as the detector, and contacts of switch S4.

When the bridge is unbalanced by receipt of a magnetic signal, current flows through coil 30 of the detector circuit, the flow of current through coil 30 causing pointer 70 to swing to one of the stationary contacts, M1 or M2. Whether the pointer closes to the left or right stationary contact is determined by the direciton of current flow (polarity) between points N—P which is initially determined by the polarity of the voltage induced in the search coil when a passing ship creates a magnetic disturbance. Direction of current flow in the search coil and control winding circuit determines which core saturates first, and so determines direction of flow through the sensitive relay.

Closure of the pointer 70 to the left stationary contact M1 or right stationary contact M2 is termed, respectively, a "left magnetic look" or a "right magnetic look," a "look" in either direction completing a different circuit through the control box 34 to energize relay RL1 and RL2 in a prescribed sequence and to operate switches SA1 and SA2 in actuation counter 35 (FIGURE 3). Once the sensitive relay pointer 70 closes to one of the contacts M1 or M2, it is held by the magnetization of the engaged contact and remains closed until the reset coil is energized at the end of the interlook dead period which is the interval of time after initiation of the live period during which no magnetic look can occur and is determined by the control box 34 since resetting is controlled solely by the control box 34.

Control box 34 energizes relay RL2 (FIGURE 2) on every look or relook through leads F and G. Energization of relay RL2 opens normally closed switches S1 and S2 thereby to disconnect search coil 20 from the control winding circuit and from attenuator 22, respectively, and also opens switch S3 to disconnect the feedback circuit from the input of the bridge 26.

After an initial left or right magnetic look or a relook, control box 34 closes the energizing circuit of relay RL1 a predetermined interval of time after the look or relook, the predetermined interval of time being the interlook dead period, to apply an energizing pulse to relay RL1. Upon being energized, relay RL1 opens switches S4 and S5 to open-circuit the bridge output and feedback circuit, respectively, and closes switch S6 to energize the reset coil RL3. Relay RL1 is a slug relay that holds for a period of time after being pulsed and provides a sufficient length of time to reset the pointer 70 to its neutral position.

Paralleled capacitors C6 and C7 automatically maintain bridge balance despite gradual changes in the characteristics of circuit components. Aging, shock, and battery depletion are among the factors that are compensated by use of these capacitors. The capacitors C6 and C7 charge to the amount of the bridge unbalancing potential caused by aging of the components. Thus, the D.C. voltage drop between points N and P due to aging of components exists across the capacitors and no current flows through the relay coil 30. However, the combined capacitance of the paralleled condensers C6 and C7 is so large that even signatures from very slow ships are not noticeably affected. Therefore, condensers C6 and C7 serve to compensate for small bridge unbalances without materially affecting the registering of bridge unbalances caused by passing vessels.

Without the balancing condensers, continuous bridge unbalance due to aging of the components would result in deflection of the pointer from its center position. A magnetic signal of one polarity that would normally be insufficient to cause a look could then close the pointer to the nearer stationary contact; and, a larger than normal magnetic signal of opposite polarity would be needed to close the pointer to the other stationary contact.

Positive feedback, which reinforces the signal current that is being applied simultaneously to the control windings, is obtained by means of resistors R9 and R10. The voltage across resistor R9 is applied through lead 51, contacts 12 and 13 of plug 18, normally closed switch S3 in control box 34 and controlled by relay RL2, lead 52, normally closed switch S5 of relay RL1, lead 53 and large inductance L8 to the control winding circuit of bridge 26. Inductance L8 serves to improve the frequency response of the firing mechanism. Because its reactance increases with frequency, it has very little effect upon the feedback due to a slow-moving ship. Faster moving ships cause a larger signal input of increased frequency to the firing mechanism, and, since inductance L8 presents a larger reactance to increased frequencies, the feedback for faster moving ships is decreased.

Referring now to FIGURE 3, control box 34 includes power supply means, time control means, and switching devices (not shown). Upon closure of pointer 70 with either contacts M1 or M2 (FIGURE 2), the operating circuit of control box 34 is closed from pointer 70 and one of contacts M1 or M2 through comon lead C and either of conductors B or D, depending upon whether the look is a left or right look, and the prescribed sequence of operations (live period, interlook dead period, and inter-ship dead period) of control box 34 is initiated to supply energizing potential in preselected time sequence to relay RL2 through leads F and G, to relay RL1 through leads A and E, to reset relay RL3 through leads C and E, and to actuation counter 35 through leads 31 and 33.

Actuation counter 35 includes a pair of normally open switches, S7 and S8, connected in series. Upon receiving an initial look of one polarity, control box 34 energizes one of the switch actuation relays, SA1 or SA2, to close either switch S7 or S8; and, upon receiving a look of opposite polarity during the live period and after the interlock period, control box 34 energizes the other of switch actuation relays, SA1 or SA2, to close the remaining of switches S7 and S8, thereby completing the operating circuit of primer control mechanism 38 which then ignites primer 39 at a time determined by the preadjusted timing mechainsm (not shown) in primer mechanism 38.

*Operation of the Firing Mechanism of FIGURES 2 and 3*

A ship passing in the vicinity of search coil 20 induces a varying D.C. voltage in the search coil which applies the induced signal to the attenuator 22 and control winding circuit 24 through pins 8 and 14 of plug 18. The applied signal is attenuated by attenuator 22, and the resultant current flows through the two control windings L4 and L7 of the magnetic amplifier 26, the direction of signal current flow being determined by the direction in which the magnetic field changes at the search coil.

The magnetic field set up at one of the control windings due to current flow therethrough aids the magnetic field surrounding its associated load winding, the magnetic field at the other control winding opposing the magnetic field of its associated load winding. Thus, there in a difference in strengths of the magnetic fields at the cores of reactors T2 and T3.

The bridge 26 is energized across points M—O by oscillator 28 to drive each core to saturation once each cycle of the oscillator frequency. When no signal is applied to the control windings L4 and L7, saturation of the cores in arm M—N and M—P is simultaneous. Under this condition, points N and P are at equal potentials, that is, no voltage difference exists between points N and P, and the bridge is in a balanced condition.

When a signal is applied to the control windings from the search coil, the reactor core subjected to the greater magnetic field saturates sooner and to a greater extent than under no-signal condition. Saturation of the second core occurs an instant later than under no-signal condition. For the instant that one core is saturated and the other is not, the impedance of the first-saturated arm of the bridge is less than the impedance of the second-saturated arm, placing points N and P at different potentials.

With points N and P at different potentials as a result of the bridge unbalance, current flows between these points once during each cycle of oscillator voltage. The unbalance current flows through the energizing coil 30 of sensitive relay RL4, causing pointer 70 to swing to the left or right as determined by the direction of current flow between N—P to register either a left magnetic look or a right magnetic look.

Assuming that the initial look is a left magnetic look, the current flow through coil 30 causes pointer 70 to engage stationary magnetic contact M1 to complete the operating circuit of control box 34 at which instant the live period, having a preselected duration of 60 or 120 seconds for example, and the interlook dead period are initiated. Since pointer 70 is magnetically held by contact M1, another magnetic look cannot be registered until pointer 70 is reset by reset relay RL3 at the termination of the interlook dead period, which may have a preselected duration of 4 seconds for example.

Simultaneous with the initiation of the live period, control box 34 energizes relay RL2 (FIGURE 2), opening switches S1, S2 and S3 to disconnect the search coil 20 from the control winding circuit 24 and the attenuator 22 through switches S1 and S2 and to disconnect the positive feedback from the control winding circuit 24 through switch S3. Opening of switches S1, S2 and S3 serve to disable magnetic amplifier 26 by search coil 20 and the positive feedback circuit R9 and R10 from the input circuit 24. Relay RL2 is held in an energized condition during the interlook dead period by control box 34.

Simultaneous with the operation of relay RL2, control box 34 applies energizing potential through leads 31 and 33 (FIGURE 3) to switch SA1, corresponding to a left magnetic look, to close switch S7 in the actuation counter 35, switch S7 remaining in the closed position throughout the remainder of the live period.

After the preselected time duration of the interlook dead period has elapsed, control box 34 energizes relay RL1 to operate switches S4, S5 and S6 and deenergizes relay RL2 to close switches S1, S2 and S3. Closure of switches S1, S2 and S3 connects search coil 20 in circuit relation with attenuator 22 and control winding circuit 24 and closes the feedback circuit through switch S3. Upon being pulse energized from control box 34, relay RL1 operates to open switch S4 which open-circuits the output circuit of amplifier bridge 26 thereby rendering winding 30 of relay RL4 insensitive. Opening of switch S5 by relay RL1 keeps the feedback circuit open while the sensitive relay RL4 is being reset. Closure of switch S6 completes the energizing circuit from control box 34 to reset relay RL3 which resets the moving contact 70 of sensitive relay RL4 to its neutral position, readying it for receipt of another magnetic look. Relay RL1, being of the slug relay type, remains in the energized position for a short period, 0.3 of a second for example, which period permits pointer 70 a sufficient length time to settle in its neutral position.

The firing mechanism is now ready to register another left relook or a right look. If a left magnetic relook should be registered due to the ship being oriented with respect to the position of the search coil in the same direction as the ship was oriented therewith upon receipt of the initial left magnetic look, then pointer 70 will close to stationary contact M1 to initiate another interlook dead period in conrol box 34 which will in turn energize relay RL2 instantly and relay RL1 in prescribed time delayed relation corresponding to the time duration of the interlook dead period to reset the sensitive relay RL4, as described heretofore.

When a right magnetic look is subsequently received due to the ship changing its position relative to the search coil so as to induce a voltage of opposite polarity in the search coil, relay RL4 is energized from the unbalance in the amplifier bridge 26 caused by the signal induced in the search coil, and the current flow through coil 30 of relay RL4 is in a direction opposite to the current flow therethrough during the left look thereby swinging pointer 70 to engage stationary contact M2 where it is held by the magnetization of contact M2. Closure of pointer 70 with contact M2 completes the right magnetic look circuit in control box 34 which functions to energize relay RL2 to disengage the search coil 20 from the control winding circuit 24 and to open the feedback circuit, as heretofore described. Simultaneously with operation of relay RL2, control box 34 energizes actuating switch relay SA1 in actuation counter 35 to close switch S8 therein to complete the circuit of primer control mechanism 38. Primer control mechanism 38 may have timing control devices and switches which may detonate primer 39 upon completion of their prescribed functions, or primer control mechanism 38 may instantly ignite primer 39 upon completion of its circuit by closure of both switches S7 and S8.

If no reverse magnetic look, that is, right magnetic look, is received after expiration of the interlook dead period after the initial left magnetic look or each left magnetic relook and before the live period is terminated, control box 34 energizes relays RL2 and RL1 simultaneously to disconnect the search coil 20 from the input circuit of the firing mechanism and to reset pointer 70 to its neutral position if it is not in the neutral position. At the same time, control box 34 deenergizes actuating switch relay SA1 to open switch S7 in the actuation counter 35. The system is maintined in this condition for a predetermined period of time, 60 or 120 seconds for example as may be desired, this period of time being termed the "intership dead period." After the intership dead period has elapsed, the control box operates to release relays RL2 and RL1 and places the firing mechanism in condition for registering passing vessel signatures again.

If it is assumed that the initial magnetic look is a right magnetic, pointer 70 engages contact M2 to initiate operation of control box 34 which then operates in the same sequence as explained above with regards to the initial left magnetic look with the exception that actuating switch relay SA2 in actuation counter 35 is energized first instead of actuating switch relay SA1 which is subsequently energized upon receipt of a left magnetic look.

It is to be understood that control box 34 comprises a plurality of rotatable cams associated with switches and power supply means for applying power in prescribed intervals to perform the aforedescribed functions, the cams and switches being arranged in any manner desired by the designer to affect the aforedescribed functions in any desired sequence at intervals of time as selected by the designer. It is also to be understood that the intervals of time stated herein are only by way of illustration for the purpose of aiding in the explanation of the sequence of operations and may be other than as stated herein.

From the foregoing, it is seen that a vessel detecting and mine detonating system is devised wherein is utilized a magnetic amplifier bridge capable of distinguishing between signals of opposite polarity induced in the system by the magnetic field charges created by a vessel passing the mine. The bridge comprises four legs and includes a pair of saturable reactor cores which saturate once for each cycle of the applied energizing potential and a sensitive relay for detecting the direction of current flow in the bridge due to the received signal from the magnetic field of a passing vessel. The bridge is further characterized by an initial potential bridge balance established by a variable resistor in one of the legs, by time-continuing bridge balance resulting from a pair of parallel connected condensers in the output of the bridge to compensate for depletion of the bridge components due to aging, by positive feedback to aid in the amplification of a received signal, and by a low power consuming requirement.

Obviously many modifications and variations of the present invention are possible in the light of the above teachings. It is therefore to be understood, that within the scope of the teachings herein and the appended claims, the invention may be practiced otherwise than as specifically described.

What is claimed as new and desired to be protected by Letters Patent of the United States is:

1. In a mine system for detecting the magnetic field indicium of a passing vessel, translating means responsive to the magnetic field of a passing vessel for deriving a signal corresponding to the indicium of said magnetic field, a magnetic amplifier bridge circuit having an input circuit and an output circuit, a source of alternating current for applying operating potential to said bridge circuit, adjustable means in said bridge circuit for equalizing the operating potential current flow through said bridge circuit whereby said bridge circuit is balanced such that no D.C. potential difference exists across said output circuit, said translating means being coupled to said input circuit for applying said derived signal to said bridge circuit thereby unbalancing the flow of current therethrough in a direction representative of the indicium of said magnetic field and resulting in a D.C. potential difference across said output circuit having a polarity corresponding to the indicium of said magnetic field, sensitive means in said output circuit operatively indicative of the polarity of said D.C. potential difference, impedance means in said output circuit for automatically compensating for bridge circuit unbalance due to degeneration of the bridge circuit components during the operation thereof, and control means including an operating circuit responsive to the operation of said sensitive means for rendering said translating means alternatingly ineffective and effective in predetermined time sequence and for rendering said sensitive means preparatorily operatively indicative for a subsequent signal applied to said bridge circuit by said translating means when said translating means is rendered effective by said control means.

2. The system of claim 1, wherein said adjustable means consists of a variable resistance, and said impedance means comprises a capacitive reactance element.

3. The system of claim 2, further including positive feedback means interconnecting said output circuit to said input circuit whereby the signal applied to said bridge by said translating means is reinforced.

4. A claim according to claim 3, wherein said sensitive means includes a coil connected in series with said capacitive reactance element for detecting the polarity of said D.C. potential difference, a pair of spaced stationary magnetized contact members, and a swinging contact member having a neutral position intermediate said spaced contact members and operatively associated with said coil to swing in a direction indicative of the polarity of said D.C. potential difference to conductively and fixedly engage one of said stationary contact members whereby the operating circuit of said control means is initiated.

5. In a system of the character disclosed, translating means responsive to the magnetic field of a passing vessel for deriving a direct current signal having a polarity corresponding to the orientation of the magnetic field with respect to said translating means, a source of alternating current, a magnetic amplifier bridge circuit having a first pair of terminals disposed at opposite points on said bridge circuit and a second pair of terminals oppositely disposed on said bridge circuit at points other than said first mentioned opposite points, all of said points defining the terminals of the legs of said bridge circuit, means connecting said alternating current source to said first pair of terminals for applying an operating potential to said bridge circuit, a pair of saturable reactor cores individually connected in adjacent legs of said bridge circuit, each of said cores having a load winding and a control winding, said cores saturating once for each cycle of said alternating current source, a pair of unilateral conductive devices individually connected in said adjacent legs, each of said devices being connected in series with the load winding in its respective leg and being similarly poled with respect to said first pair of terminals, a resistor for each of said devices connected in shunt with its respective unilateral conductive device, one of said resistors being selectively adjustable to compensate for inherent impedance differences in the components of said bridge circuit for balancing said bridge circuit whereby the operating potential current flow therethrough is equalized such that no D.C. potential difference exists across said second pair of terminals, said control windings being serially connected in phase opposition to form the signal input circuit of said bridge circuit whereby a D.C. signal applied to said input circuit causes one of said cores to saturate in time delayed relation with respect to the other core resulting in bridge unbalance during the interval between saturation of the two cores to develop a D.C. potential difference across said second pair of terminals of a polarity correspondingly representative of the polarity of the applied D.C. signal, said translating means being coupled to said input circuit for applying said derived D.C. signal to said input circuit to unbalance said bridge circuit, capacitive reactance means and current sensitive means serially connected across said second pair of terminals, said reactance means automatically compensating for gradual characteristic variations of said bridge circuit due to degeneration thereof, said sensitive means having a normally open switch operatively associated therewith and being responsive to the D.C. potential difference developed across said second pair of terminals to close said switch, and control means including an operating circuit connected to said switch whereby closure of said switch completes said operating circuit to initiate the operation of said control means, said control means being operatively associated with said translating means and said switch means to open said switch after said switch has been in the closed position for a predetermined duration of time and to alternatingly decouple and couple said translating means to said input circuit in predetermined time sequence during said predetermined time duration.

6. The system of claim 5, further including a pair of resistors serially connected across said sensitive means and an inductance interconnecting the common junction of said resistors to said input circuit for applying a positive feedback potential to said bridge circuit; and wherein said switch comprises a pair of spaced stationary magnetized contact members, and a swinging contact member having a neutral position intermediate said spaced contact members and operatively associated with said sensitive means to swing in a direction indicative of the polarity of said D.C. potential difference to fixedly engage one of said stationary contact members whereby the operating circuit of said control means is closed.

7. The system of claim 6, further including centering blades adaptable upon actuation thereof to return said swinging contact member to its neutral position, and a reset coil responsive to the operation of said control means to actuate said blades after said predetermined time duration has elapsed.

8. The system of claim 7, further including relay switching means under control of said control means to effect said alternatingly coupling and decoupling of said translating means, and a purely resistive element connected across said input circuit for limiting the random transients induced by the switching action of said relay switching means.

9. In a polarity discriminating magnetic bridge amplifier adaptable upon the operation thereof to permit current flow therethrough in a direction corresponding to the polarity of direct current input signals, a variable resistor selectively adjustable to initially balance the impedance of said bridge amplifier when not in operation, a pair of output terminals, capacitive reactance means and a current detecting coil connected in series across said output terminals, said reactance means automatically compensating for gradual impedance variations in said bridge amplifier caused by the degeneration of the components of said bridge amplifier during the operation thereof, said coil detecting the direction of current flow through said bridge amplifier, a pair of spaced stationary magnetized contacts positionally corresponding to opposite directions of current flow, a swinging contact having a neutral position intermediate said spaced contacts and operatively associated with said coil to swing in a direction corresponding to the direction of current flow detected by said coil to fixedly engage the one of said stationary contacts positionally representing the direction of current flow detected by said coil, centering means adaptable upon actuation thereof to restore said swinging contact to its neutral position, and means influenced by the engagement of said swinging contact with one of said stationary contacts for actuating said centering means.

10. A polarity discriminating magnetic bridge amplifier comprising, a pair of saturable reactor cores each having a control winding and a load winding, the load winding of one of said cores being serially connected with an unidirectional conductive device which is shunted by a fixed resistor to define one leg of the bridge amplifier, the load winding of the other of said cores being serially connected to another unidirectional conductive device which is shunted by a variable resistor to form a second leg of the bridge, said first and second legs each having one terminus connected to a first common junction, said devices being similarly poled with respect to said common junction, a first resistor and a first capacitor connected in parallel to form a third leg of said amplifier, said third leg having one terminus connected to the other terminus of said first leg to form a second junction, a second resistor and a second capacitor connected in parallel to form a fourth leg of said amplifier, said fourth leg having one terminus connected to the other terminus of said third leg to form a third junction and having the other terminus connected to the other terminus of said second leg to form a fourth junction, a source of alternating current connected across said first and third junctions for applying an operating potential to said bridge amplifier, said control windings being serially connected in phase opposition to form the signal input circuit of said bridge amplifier, means adaptable to apply direct current signals of either polarity to said input circuit, an output circuit including reactance means having a large capacitive reactance in series with a current sensitive coil connected across said second and fourth junctions to detect the polarities of the direct current signals applied to said input circuit, a pair of space stationary magnetized contacts so positioned that one of said contacts represents a direct current signal input of positive polarity and the other of said contacts represents a direct current signal input of negative polarity, a swinging contact having a neutral position intermediate said spaced contacts and operatively associated with said coil to swing in a direction indicative of the polarity of a direct current signal applied to said input circuit to fixedly engage the one of said stationary contacts corresponding to the polarity of the applied input signal, and reset means actuable upon engagement of said swinging contact with one of said stationary contacts to restore said swinging contact to its neutral position after a predetermined interval of time has elapsed.

11. In a polarity discriminating magnetic bridge amplifier having four legs, the combination comprising an alternating current source for applying an operating potential to said bridge amplifier, a pair of saturable reactor cores each having a load winding and a control winding, each load winding being connected in series with a rectifier to form adjacent legs of said bridge amplifier, the other two legs containing like elements of substantially equal impedance values, a variable resistor in one of said adjacent legs selectively adjustable to initially compensate for unequal impedances presented by like and similarly functioning components distributed in said four legs whereby the combined impedance of one of said adjacent legs with one of said other two legs is equal to the combined impedance of the other of said adjacent legs with the other of said other two legs, the control windings of said cores being serially connected in phase opposition to form the signal input circuit of said bridge amplifier, means coupled to said input circuit and adaptable to apply direct current signals of fortuitous polarities to said input circuit, an output circuit connected across said adjacent legs for detecting the polarities of the direct current signals applied to said input, capacitive reactance means in said output circuit automatically compensating for gradual impedance variations in said four legs deviating from said initially compensated unequal impedances due to degeneration of the components in said four legs, and means responsive to said output circuit for registering individaully the detected polarities of the applied signals received at discrete intervals of time.

References Cited in the file of this patent
UNITED STATES PATENTS 2,728,042  Ruhland _____ Dec. 20, 1955